United States Patent
Basfar et al.

(10) Patent No.: US 9,574,021 B1
(45) Date of Patent: *Feb. 21, 2017

(54) POLYMER NANOPARTICLE PREPARATION BY MINIEMULSION POLYMERIZATION

(71) Applicant: King Abdulaziz City for Science and Technology (KACST), Riyadh (SA)

(72) Inventors: Ahmed Ali Basfar, Riyadh (SA); Klaus Jähnichen, Dresden (DE); Brigitte Voit, Dresden (DE)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 14/827,270

(22) Filed: Aug. 14, 2015

(51) Int. Cl.
| | |
|---|---|
| *C08F 2/24* | (2006.01) |
| *C08F 2/44* | (2006.01) |
| *G03G 9/08* | (2006.01) |
| *C08F 12/08* | (2006.01) |
| *C08K 3/04* | (2006.01) |
| *G03G 9/087* | (2006.01) |

(52) U.S. Cl.
CPC . *C08F 2/24* (2013.01); *C08F 2/44* (2013.01); *C08F 12/08* (2013.01); *C08K 3/04* (2013.01); *G03G 9/08706* (2013.01)

(58) Field of Classification Search
CPC .............. C08F 2/24; C08F 2/44; C08F 12/08; G03G 9/08706; C08K 3/04
USPC ........................................................ 524/156
See application file for complete search history.

(56) References Cited

U.S. PATENT DOCUMENTS

2010/0160492 A1* 6/2010 Liang ................... C09D 11/037
523/205
2014/0350186 A1* 11/2014 Hatae .................... C08F 265/06
525/187

OTHER PUBLICATIONS

Mandavian et al. "Nanocomposite particles with core-shell morphology. I. Preparation and characterization of Fe3O4-poly(butylacrylate-styrene) particles via miniemulsion polymerization", Journal of Applied Polymer Science (2008), 110(2), 1242-1249.*
Chakraborty et al. "Synthesis of Magnetic Polystyrene Nanoparticles Using Amphiphilic Ionic Liquid Stabilized RAFT Mediated Miniemulsion Polymerization", Macromolecules 2014, 47, 4186-4198.*
Mahdavian et al. "Nanocomposite particles with core-shell morphology. I. Preparation and characterization of FesO4-poly(butylacrylate-styrene) particles via miniemulsion polymerization", Journal of Applied Polymer Science (2008), 110(2), 1242-1249.*

* cited by examiner

*Primary Examiner* — Michael M Bernshteyn
(74) *Attorney, Agent, or Firm* — Geeta Kadambi; Riddhi IP LLC

(57) ABSTRACT

The present disclosure relates to a composition and a method to prepare a polymer nanoparticle using miniemulsion polymerization (MEP) comprising a monomer, a reactive co-stabilizer and a reactive surfactant. The reactive co-stabilizer as disclosed is a methacrylate containing perfluorinated or semifluorinated side chains like 1H,1H,2H,2H-perfluorodecyl methacrylate ($H_2F_8MA$). Further, the reactive stabilizer as used in the preparation is cetyl trimethyl ammonium chloride (CTAB). The polymer nanoparticle as formed has an enhanced stability and low VOC as compared to a pure polymer prepared by MEP.

14 Claims, 1 Drawing Sheet

POLYMER NANOPARTICLE PREPARATION BY MINIEMULSION POLYMERIZATION

FIELD OF TECHNOLOGY

This disclosure relates generally to a polymer nanoparticle preparation by microemulsion polymerization. More specifically, this disclosure relates to a polymer nanoparticle by microemulsion polymerization using reactive co-stabilizer and surfactant.

BACKGROUND

Nearly 40 years ago a special kind of emulsion polymerization was firstly reported: the miniemulsion polymerization (MEP) (Ugslstad et al., 1974). In this technique a co-stabilizer, sometimes also called hydrophobe is used to retard the diffusion of monomer molecules from smaller droplets to larger ones (Ostwald ripening effect). Kinetically stable small monomer droplets are formed in the presence of co-stabilizer and the polymerization process can run in these droplets. Using this method it is possible to polymerize water insoluble monomers because there is no need to diffuse from the monomer droplets to the micelles like in emulsion polymerization. In most of MEP a droplet nucleation dominates. That means the polymerization takes place inside the monomer droplets like in a suspension polymerization. As a consequence very small particles can be obtained by this method (<500 nm).

Besides the commonly used hydrophobic hexadecane (HD) as co-stabilizer in MEP a large variety of substances was used as co-stabilizer in MEP. However, there is still a lack of co-stabilizers in the process of MEP that can provide enhanced stability and low volatile organic content (VOC) to a polymer as prepared by MEP.

SUMMARY

The present disclosure related to a composition and a method of preparation of a polymer particle by MEP. Further, the present disclosure relates to a composition and a method of preparation of a polymer nanoparticle by MEP in the presence of reactive co-stabilizer. In yet another embodiment, the present disclosure relates to a composition and a method of preparation of a polymer nanoparticle by MEP in the presence of a reactive surfactant. In most embodiments, the reactive co-stabilizer comprises of a methacrylate derivative.

In one embodiment, the present disclosure relates to a composition comprising, a monomer, a reactive co-stabilizer and a reactive surfactant, wherein a polymer nanoparticle is formed by MEP. In another embodiment, the composition further comprise of methacrylate containing perfluorinated alcohol as a co-stabilizer. In yet another embodiment, the composition further comprise of semi-fluorinated alcohol as a co-stabilizer. The perfluorinated or semifluorinated co-stabilizer comprise of a side chain like 1H,1H,2H,2H-perfluorodecyl methacrylate ($H_2F_8MA$) as reactive hydrophobe or co-stabilizer.

In one embodiment, the polymer particle as prepared has an enhanced hydrophobicity owing to the formation of co-polymers between styrene and co-stabilizer as compared to pure polymer by a miniemulsion process using HD as a co-stabilizer. In another embodiment, the polymer particle as prepared has a low VOC owing to the polymerization of co-stabilizer as compared to a pure polymer by a miniemulsion process using HD as a co-stabilizer.

In one embodiment, a preparation of a polymer nanoparticle using a monomer, In another embodiment, the monomer is styrene (St) is disclosed. In one embodiment, a second monomer may be introduced along with St to prepare a polymer nanoparticle. In another embodiment, the addition of the second polymer results in a tunable glass transition temperature (Tg). The second monomer may be n-butyl acrylate (n-BuA).

In one embodiment, a composition and a process of MEP of St using H2F8MA as a co-stabilizer is disclosed. In another embodiment, the process further comprise of using SDS as a reactive surfactant.

In one embodiment, the polymer nanoparticles as produced by MEP using reactive co-stabilizer such as perfluorinated or semifluorinated alcohol. In another embodiment, the polymer nanoparticles are produced by using a reactive surfactant. The reactive surfactant may be a sodium dodecyl sulfate (SDS) or a cetyl trimethyl ammonium chloride (CTAB).

In one embodiment, the size of polymer nanoparticles as prepared is in the range of 20 nm to 1000 nm. In another embodiment, the size of the polymer nanoparticles as prepared is in the range of 50 nm to 300 nm. To obtain a range of 50 nm to 300 nm, reactive co-stabilizer is added in 0.5 to 15 mol %, preferably 2-7 mol %, with regard to the primary monomer such as styrene.

In one embodiment, the present disclosure also relates to a composition and a process of preparation of a polymer/carbon black (CB) composite particle using MEP in the presence of a reactive co-stabilizer and a reactive surfactant. In another embodiment, the reactive co-stabilizer comprise of a methacrylate derivative. In yet another embodiment, the reactive surfactant may be a sodium dodecyl sulfate (SDS) or a cetyl trimethyl ammonium chloride (CTAB). The composite particle as prepared is in the size range of 20 nm to 1000 nm in the presence of CB.

In one embodiment, the composition further comprise of methacrylate containing perfluorinated alcohol as a co-stabilizer. In yet another embodiment, the composition further comprise of semi-fluorinated alcohol as a co-stabilizer. The perfluorinated or semifluorinated co-stabilizer comprise of a side chain like 1H,1H,2H,2H-perfluorodecyl methacrylate ($H_2F_8MA$) as reactive hydrophobe or co-stabilizer.

In one embodiment, the polymer/CB composite particle was based on a polystyrene or a polystyrene dominated copolymers. In another embodiment, the polymer/CB composite particle size was in the range of 20 nm to 1000 nm and a low VOC content. The CB content is in the range of 0.5-20 wt %, preferably 2-10 wt %, and the CB has primary particles sizes between 20 and 60 nm, is high or low structured, oxidized or non-oxidized, and shows pH values between 3 and 10.

In one embodiment, the polymer/CB composite particle prepared in the presence of a reactive co-stabilizer and a reactive surfactant has a low VOC. In another embodiment, the polymer/CB composite particle as prepared has a zero VOC.

The above mentioned summary presents a simplified version of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. Other aspects will be apparent from the following description, figures and the appended claims.

DETAILED DESCRIPTION

Figure 1:
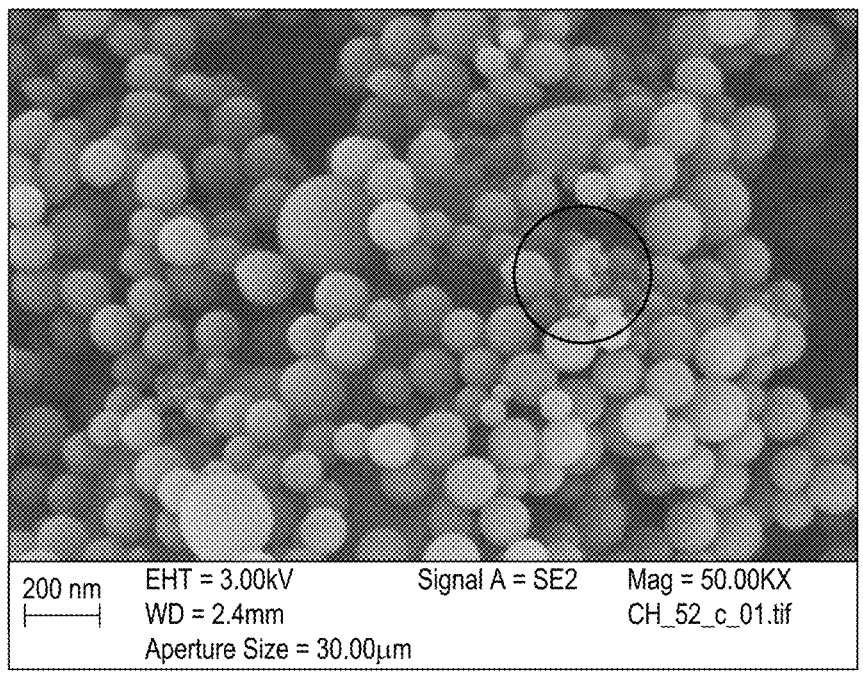
FIG. 1 shows SEM picture of PSt/CB composite (5 wt % PRINTex® 150) using $H_2F_8MA$ as co-stabilizer and CTAB as surfactant.

In the present invention, hydrophobic polymer nanoparticles were prepared by the MEP technique using methacrylates based semifluorinated or perfluorinated alcohols as the only co-stabilizer or hydrophobe. Methacrylate containing perfluorinated or semifluorinated alcohol comprise of side chains like 1H,1H,2H,2H-perfluorodecyl methacrylate ($H_2F_8MA$) (Formula 1) with the primary goal to act as reactive hydrophobe or co-stabilizer and not as comonomer.

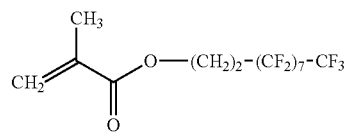

Formula 1: Structure of 1H,1H,2H,2H-perfluorodecyl methacrylate.

There is a significant difference between the mechanism of a conventional emulsion and a MEP. MEP involves the use of an effective surfactant and a co-stabilizer system to be in place and produces very small monomer droplets. There can be a variety of monomers and one can also use the prepared monomers as carriers. The presence of surfactant and a co-stabilizer system retards monomer diffusion from the submicron droplets. Both are necessary to effect predominant droplet nucleation. A number of studies have been conducted showing use of different types of surfactants and co-stabilizers to carry out polymer formation with MEP.

The papers of Crespy (Crespy and Landfester, 2010) and Antonietti (Antonietti and Landfester, 2002) give an overview about the use of different co-stabilizers: reactive or unreactive low molecular weight, oligomeric or polymeric substances.

Few papers described the preparation of fluorine containing latexes by MEP and in those cases, the fluorinates compounds were commonly used as classical comonomers, not as reactive co-stabilizers or hydrophobes. Co-stabilizers and hydrophobes are interchangele term and used in the same context throughout the specification. Landfester (Landfester et al, 2002) described the synthesis of latexes from the perfluorinated methacrylate $C_2F_6MA$ by MEP using SDS as surfactant and different non-reactive perfluorocarbons as well as the classical HD as co-stabilizer. It was a very convenient way to get latexes from fluorinated monomers with a particle size ranging between 100 and 200 nm, which are usually not so easy to prepare. HD was not suitable to prepare stable miniemulsions because of the incompatibility with the fluorinated monomer. Also copolymers of $C_2F_6MA$ with St, MMA or n-BuA were synthesized by MEP. In these experiments a 1:1 weight ratio between fluorene containing monomer and non-fluorinated monomers was applied. SDS or CTAB were used as surfactants.

The experiments with St as comonomer and SDS resulted in spherical particles (120-240 nm) with a relatively broad particle size distribution. For all of the other recipes the formation of non-spherical or open particles was observed. The films formed from the latexes showed very high contact angles with water as measuring liquid.

The preparation of a fluorinated acrylate latex was also reported by Guo (Guo et al, 2014) using octamethyl cyclotetrasiloxane and tetravinyl tetramethyl cyclotetrasiloxane as co-stabilizers in MEP of MMA, n-BuA and dodecafluoroheptyl methacrylate. The authors used 10, 20, and 40 mass % of the fluorine containing monomers based on MMA/n-BuA.

Li (Li et al, 2008) reported in another paper the copolymerization of MMA and n-BuA by MEP in the presence of dodecafluoroheptyl methacrylate. It was discussed that the co-stabilizer is formed during the polymerization. However, no stable miniemulsions were formed with these systems. The final products showed relatively broad particle size distributions or even bimodal distributions.

Block copolymers from 2,3,4,5,6-pentafluorostyrene and St were used together with perfluoromethyl cyclohexane as non-reactive co-stabilizers for the MEP of Olefins using metallocenes as catalysts by Nenov (Nenov et al, 2009). The resulting particles showed a size of about 100 nm.

Pich (Pich et al, 2005) investigated the MEP of St and n-BuA in the presence of a fluorine containing surfmer (ester made from maleic anhydride and a perfluorinated $C_8$ alcohol). In all of the MEP experiments HD was added as co-stabilizer. It was found that the maleic acid monoester was incorporated into the polymer chain during the polymerization. With increasing amount of the surfmer the particle size could be reduced as expected. Furthermore, the preparation of very hydrophobic latexes could be realized even at relatively low content of fluorine containing surfmer when compared to a latex made from the fluorine containing monomer $C_2F_8MA$ in the presence of HD as co-stabilizer.

Suzuki (Suzuki et al, 2005) investigated the preparation of poly ($C_2F_8MA$) using SDS as surfactant and KPS as initiator. No co-stabilizer was added. The particle size of the droplets (standard experiment gave 190 nm) could be further influenced by the variation of [SDS]. A range between 118 and 315 nm was realized. The reaction time until 100% conversion was dependent on the particle size and ranged between 10 min and 30 min. The MEP of different acrylates from semifluorinated alcohols with MMA and dodecyl methacrylate (LMA) in the presence of CTAB/ethoxylated nonyl phenol mixtures as surfactant was also investigated by Zhang (Zhang et al, 2007). The weight ratio of F-acrylate to LMA to MMA was 4:3:3. Relatively broad particle size distribution was reported for the obtained latex.

The commonly used low molecular weight co-stabilizers like HD or hydrophobic oils have the drawback that they retain only physically bound in the products after the polymerization reaction. Finally, polymeric nanoparticles were obtained which still contain volatile substances. Despite the boiling point of HD is relatively high with about 287° C., the thermogravimetric analysis of pure HD showed evaporation at temperatures up to 200° C. with a $T_{onset}$ of 89° C. and $T_{10\%}$ of 133° C. (TGA under $N_2$, 10K/min). The liberation of volatile substances cannot be excluded in applications where higher temperatures are not unusual. In order to reduce the VOC reactive co-stabilizers replace the "volatile" HD. The use of reactive co-stabilizers like $H_2F_8MA$ offers the possibility to get products with reduced VOC when compared to the often used HD as co-stabilizer. Furthermore, it is also possible to prepare polymer/CB composites by MEP using these semifluorinated co-stabilizers. The $T_g$ of a copolymer depends on the composition of the copolymers. Depending on the ratio of the monomers used the $T_g$ of the final polymer can be tuned. Furthermore, the addition of a second monomer like n-butyl acrylate (n-BuA) resulted in the formation of copolymers of styrene and n-BuA. $T_g$ of these formed copolymers can be tuned by the ratio of St and n-BuA. Zero emission polymer or polymer/composite particles can be achieved by replacing non only the co-stabilizer but also the primary surfactant by a reactive, meaning polymerizable surfactant.

The reactive co-stabilizer is incorporated by covalent bonds into the polymer chain after the polymerization. Polymeric particles of a highly hydrophobic nature in the range of 50 nm to several 100 nm containing bound methacrylates with perfluorinated or semi-fluorinated alcohols can be obtained by the described process. The addition of a further monomer like n-BuA allows the tuning of the $T_g$ of the copolymers if it is desired. The replacement of the commonly used non-reactive surfactants SDS or CTAB by a reactive surfactant like NaSS is also possible for the MEP of monomers using fluorinated methacrylates as co-stabilizer. By doing this, the content of low molecular weight components can be reduced to nearly zero. Furthermore, polymer/carbon black (CB) composite formation with CB content up to 10 wt % is also possible.

Thus, the present invention discloses MEP of hydrophobic monomers such as (but not limited to) Styrene (St) with methacrylates based semifluorinated or perfluorinated alcohols as co-stabilizer in the presence of a reactive surfactant such as CTAB or other such surfactants. These methacrylates open an interesting alternative to the commonly used co-stabilizers like HD or methacrylates containing long alkyl chains. The co-stabilizer is covalently bound into the polymer particles through copolymerization with the primary monomer such as St. The use of a methacrylate containing perfluorinated or semifluorinated side chains like 1H,1H,2H,2H-perfluorodecyl methacrylate ($H_2F_8MA$) with the primary goal to act as reactive hydrophobe or co-stabilizer and not as co-monomer and without adding any additional non-reactive co-stabilizer enhanced stability of prepared polymer with using MEP technique.

EXPERIMENTAL

The following samples describe the preparation of PSt nanoparticles by MEP using methacrylates from semi-fluorinated or perfluorinated alcohols, especially $H_2F_8MA$ as co-stabilizer. Furthermore, the preparation of PSt (Polystyrene)/CB (Carbon Black) composites by MEP with these special co-stabilizers is also described.

Reagents and Materials $H_2F_8MA$ was purchased from ABCR. Styrene, n-Butyl acrylate, CTAB, Sodium styrene sulfonate, HD, 2,2'-Azobis (2-methylpropionitrile) (AIBN), Phosphorous pentoxide, calcium hydride, tetrahydrofurane, hexane and chloroform were purchased from Sigma-Aldrich. SDS was purchased from Fluka. Hydroxyaluminium bis[2-hydroxy-; 3,5-di t-butyl salicyic acid Zirconium salicylate were purchased from Korean Material technology. Methanol was purchased from ACROS. Carbon blacks such as NIPex® 35 and NIPex® 150 were purchased from Evonik.

MEP of St Using $H_2F_8MA$ as Co-Stabilizer (Examples 1-8 as Shown in Table 1)

4.27 g of purified St, 0.378 g $H_2F_8MA$ (98%), and 0.135 g AIBN were weighted. After mixing by shaking the organic phase the required amounts of surfactant SDS (0.051 g) and water (41.6 g) were added. Then the mixture was slowly stirred with ca. 150 rpm under $N_2$ (the needle for purging with $N_2$ was not in the mixture, very small stream of $N_2$) for 15 min. During this time the SDS was dissolved in water. A formation of pre-emulsion was not observed because of the slow stirring. Then the mixture was stirred under $N_2$ at 800 $min^{-1}$ for 30 min to prepare the pre-emulsion using a glass stirrer. The distance between top side fastener stirrer and lower side of the fastener motor was measured and used in further experiments. So the stirring conditions were comparable. After 30 min the mixture was transferred to the sonifier. During this a moderate stream of $N_2$ was applied. The miniemulsion was prepared by sonication of the pre-emulsion for 600 s (level 7, pulse, duty cycle 50%) with an ultrasonic disintegrator Branson 450 W using a ½" minitip. The connection between vessel and tip was realized by a special Teflon adapter. Due to the adapter a tight connection between minitip and vessel could be realized. During all operations the vessel was purged with a slight stream of nitrogen. A cooling of the reaction vessel by ice water was performed during the sonication in order to avoid a heating of the mixture. The reaction vessel with the formed miniemulsion was transferred to the preheated thermostat (66° C.). The reaction was performed at 400 $min^{-1}$ for 3 h. Then the mixture was cooled to room temperature within 5 min using ice-water. Before the storage of the dispersion, ca. 200 mg of a 1 wt % solution of HQ in water was added and the mixture was shaken.

For the samples 7 and 8 (Table 1) n-BuA was added to the St. Then the experiments were performed as described above for 4 h instead of 3 h without n-BuA. Dispersions with 20 wt % solid content showed a very high viscosity. Following the addition of n-BuA, resulting dispersion showed a very high viscosity. They were hardly to stir. Consequently, the solid content of the total mixture was reduced to 10 wt %, (see Table 1).

Removal of Coagulum

After the polymerization, the formed dispersion was poured through a mesh (pore size 20 μm×20 μm) and then used for the analytical investigations. Finally, the rest in the mesh and the rests from the stirrer and the vessel were transferred into a frit using water. The coagulum was washed with water and dried in vacuum at room temperature in order to determine the quantity of coagulum.

Determination of Conversion

Three samples of 2 g of the formed dispersion were weighted in a petri dish and kept overnight at room temperature. The air dried products were dried in vacuum at room temperature until the weight was constant. $P_4O_{10}$ was used as drying agent in the vacuum oven.

Size Exclusion Chromatography (SEC)

SEC measurements were performed with an apparatus of the Agilent Series 1100 (RI detection, 1PL_MIXED-B-LS-column (7.5×300 mm) and 10 μm PSt gel Agilent column, Chloroform 1.0 mL/min) PSt was used as standard. This was the standard method for all of the samples. The samples containing CB were filtrated to remove the CB before the analysis. The error of the method is about 10%.

Particle Size Measurements

The particle size measurements were performed with a Zetasizer NANO S (Malvern) at a fixed scattering angle of 173°. The given values as shown in Table 2 are the $z_{ave}$ (intensity based). The error of the measurements is about 5%. Higher values of particle size distribution index (PDI), as shown in Table 2 mean that the particle size distribution becomes broader.

Preparation of Samples for the DLS Measurements

The measurements were performed in 0.01 N NaCl solutions according to the Malvern recommendation for the measurements of latex standards. For the experiments with 20 wt % solid content ca. 250 mg of the dispersion was weighted and ca. 20 g of 0.01 N NaCl solution was added. For the samples with lower solid content (10 or 15 wt %) the amount of NaCl solution was proportionally reduced to keep the concentration of the thinned dispersions nearly constant. The particle sizes of 3 samples were estimated, every of them was consecutively measured twice. In few cases the application of NaCl solution led to a precipitation of the dispersion. Therefore, the dispersion was thinned only with pure Millipore water.

Scanning Electron Microscopy (SEM)

Figure 2:
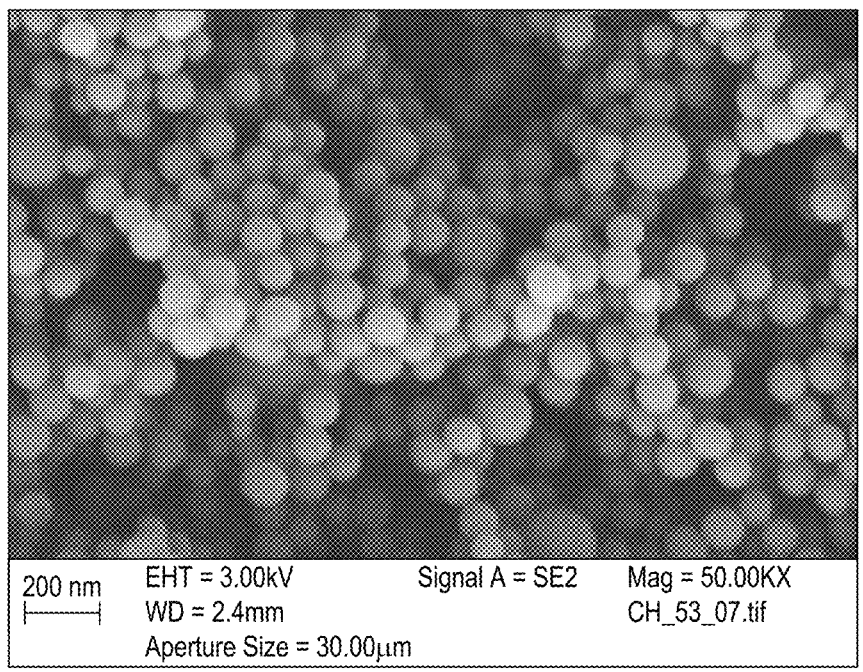
FIG. 2 shows SEM picture of PSt/CB composite (5 wt % PRINTex® 35) using $H_2F_8MA$ as co-stabilizer and CTAB as surfactant.

The SEM investigations were performed with an Ultra 55 plus (Zeiss). The thinned dispersions from the DLS measurements were used to prepare the samples. One drop was placed on a purified silicon wafer mounted at a sample holder. After air drying the samples were sputtered with 3 nm Pt. Preparation of PSt/CB composites using $H_2F_8MA$ and different surfactants such as SDS, CTAB and NaSS (as shown in examples 9-11 in Table 1). Following polymerization, a part of the resultant dispersion was thinned with 0.01 normal NaCl solution in deionized water (200-250 mg dispersion were thinned with 10 g of NaCl solution). This thinned dispersions were used for the particle size measurements as well as for the SEM investigations. The picture shows the particles of PSt/CB composite (5 wt % PRINTex®150) which were obtained by the MEP of St in the presence of CB. The fluorinated monomer $H_2F_8MA$ was used as co-stabilizer instead of the often used hexadecane as co-stabilizer. Most probably, the small spherical particles consist of unmodified polymer particles (not marked). Larger spherical and particles (white marked) and asymmetrical (black marked) represent the formed St/CB composites. Beside modified CB particles also unmodified CB was detected (circled) (FIG. 1). As shown in FIG. 2, for the experiment with PRINTex®35 no unmodified CB was detected by SEM investigations. It is assumed that the large particles contain the CB.

In MEP experiments with St replacing HD by $H_2F_8MA$ a very stable miniemulsion was obtained and polystyrene particles with diameters below 200 nm resulted. Best results are obtained using 1-7 mol % $H_2F_8MA$ (based on styrene) (Tables 1 and 2). For comparison, a reference sample using SDS as surfactant and HD as co-stabilizer is given in Tables 1 and 2. The MEP of St in the presence of HD resulted in small particles of 78 nm ($z_{ave}$, intensity based) with a PDI of 0.06. However, the SEM investigations showed also a small amount of particles in the µm scale as unwanted side products. The replacement of HD by the fluorinated monomer $H_2F_8MA$ let to a nearly doubling of the particle size from 78 to 126-135 nm. The PDI of the latexes prepared with a comparable ratio of surfactant SDS and co-stabilizer can be increased for the samples with $H_2F_8MA$ without compromising the positive MEP results. A decrease of PDI was realized by the use of up to 4-7 mol % $H_2F_8MA$ (based on St, examples 3, 4 shown in Table 2). A further improvement of PDI (reduction) can be realized by the replacement of the commonly used SDS by the cationic surfactant CTAB (examples 5, 6). Even with small amount of $H_2F_8MA$ (3 mol % based on St) very nicely evenly distributed particles were obtained. Generally, the conversion of the monomers was above 90% in all of the runs with SDS or CTAB and the amount of coagulum was nearly negligible. The incorporation of the fluorinated methacrylate did not show any influence on the $T_g$ of the resulting copolymers. In order tune the $T_g$ a $2^{nd}$ monomer can be incorporated. The copolymerization of St and nBuA (8 mol % n-BuA) by MEP technique was also performed using $H_2F_8MA$ as co-stabilizer. Monomer conversion>95% was obtained after 4 h polymerization time. The particle size of 121 nm ($Z_{ave}$, intensity based) was in a comparable range to the samples using only St. The MEP of St was also performed using a reactive surfactant like sodium styrene sulfonate (NaSS) and $H_2F_8MA$ as co-stabilizer (example 8). The particle size increased from 121 to 157 but the particle size distribution dropped from 0.06 to 0.02. This offers the possibility for the preparation of F-containing latexes having ionic groups at the surface of the particles. Samples containing NaSS were not soluble in organic solvents like chloroform or THF. The use of a cationic monomer vinyl benzyl trimethylammonium chloride as reactive surfactant in the system St/$H_2F_8MA$ is also possible.

For the first time MEP of St/CB composites were successfully performed in the presence of a methacrylate based on fluorinated or semifluorinated alcohol like $H_2F_8MA$ as co-stabilizer. CTAB was the most effective surfactant for the preparation of the St/CB composites. The content of CB can be varied between 0 and 10 mass % (based on St). Spherical and asymmetric polymer particles in the range between 100-200 nm were observed demonstrating effective preparation of polymer composite particles and polymer covered CB, see FIGS. 1 and 2. High monomer conversion>90% can be achieved by further optimization of polymerization conditions.

Preparation of PSt/CB Composite Particle Using $H_2F_8MA$ and Different Surfactants (Examples 9-11 as Shown in Table 1)

Two different CB types (but not limited to) NIPex®35 and NIPex® 150 were selected for the preparation of PSt/CB composite particle. NIPex®35 is a non-oxidized, low structure furnace black with a mean primary particle size of about 31 nm and a pH value of about 9 (according to DIN ISO 787/9). NIPex® 150 is a high structure oxidized gas black with a mean primary particle size of about 25 nm and a pH value of about 4 (according to DIN ISO 787/9). The procedure as described for MEP of St using $H_2F_8MA$ as co-stabilizer is repeated using the recipe described in the $2^{nd}$ part of Table 1. The CB was added to the organic phase at the beginning and the organic phase was shaken. Then water and the surfactant were added to the mixture and was processed. The polymer/CB composite particle as prepared using a reactive, fluorinated co-stabilizer can be used as a basic resin in materials for toner applications, however, the use is not limited to the field of toner applications.

TABLE 1 shows recipes for the MEP experiments using $H_2F_8MA$ as co-stabilizer

| Example | Water [g] | Styrene [g] | Surfactant Type | Surfactant [mg] | Hydrophobe Type | Hydrophobe [mg] | AIBN [mg] | Filler Type | Filler [mg] | Filler [wt %]* |
|---|---|---|---|---|---|---|---|---|---|---|
| 0 Reference | 37.7 | 8.6 | SDS | 103 | HD | 359 | 269 | without | 0 | 0 |
| 1 | 41.7 | 4.3 | SDS | 51 | $H_2F_8MA$ | 692 | 135 | without | 0 | 0 |
| 2 | 41.6 | 4.3 | SDS | 59 | $H_2F_8MA$ | 1102 | 133 | without | 0 | 0 |
| 3 | 41.7 | 4.3 | SDS | 51 | $H_2F_8MA$ | 1519 | 135 | without | 0 | 0 |
| 4 | 41.6 | 4.3 | SDS | 105 | $H_2F_8MA$ | 1467 | 134 | without | 0 | 0 |
| 5 | 41.6 | 4.28 | CTAB | 131 | $H_2F_8MA$ | 730 | 134 | without | 0 | 0 |
| 6 | 41.6 | 4.29 | CTAB | 132 | $H_2F_8MA$ | 1460 | 133 | without | 0 | 0 |
| 7 | 41.6 | 3.9/0.46$^a$ | CTAB | 130 | $H_2F_8MA$ | 731 | 134 | without | 0 | 0 |
| 8 | 37.7 | 7.810.8$^b$ | NaSS | 103 | $H_2F_8MA$ | 357 | 134 | without | 0 | 0 |
| 9 | 41.6 | 4.28 | CTAB | 65 | $H_2F_8MA$ | 731 | 133 | CB150 | 214 | 5 |
| 10 | 41.6 | 4.28 | CTAB | 130 | $H_2F_8MA$ | 731 | 134 | CB150 | 214 | 5 |
| 11 | 41.6 | 4.28 | CTAB | 65 | $H_2F_8MA$ | 730 | 133 | CB35 | 214 | 5 |

* based on St
$^a$10 wt % n-BuA based on St =, polymerization for 4h
$^b$9 wt % n-BuA based on St =, polymerization for 4h

TABLE 2 shows results obtained for the MEP of St using $H_2F_8MA$ as co-stabilizer.

| | Particle size DLS | | SEC | | | Con- | Co- |
|---|---|---|---|---|---|---|---|
| Example | z-ave [nm] | PDI | $M_n$ [g/mol] | $M_w$ [g/mol] | $M_w/M_n$ | version [%] | agulum [%] |
| 0 (Reference) | 78 | 0.06 | 149000 | 693000 | 4.7 | 94 | 0.3 |
| 1 | 126 | 0.10 | 76000 | 438000 | 5.8 | 92 | 0.7 |
| 2 | 135 | 0.08 | 72000 | 364000 | 5.1 | 95 | 0.6 |
| 3 | 134 | 0.05 | 77000 | 376000 | 4.9 | 94 | 0.1 |
| 4 | 135 | 0.04 | 71000 | 286000 | 4.0 | 97 | 0.1 |
| 5 | 130a | 0.04 | 68000 | 316000 | 4.6 | 94 | 0.1 |
| 6 | 115 | 0.05 | 99000 | 480000 | 4.8 | 97 | 0.1 |
| 7 | 121 | 0.06 | 69000 | 329000 | 4.8 | 99 | 0.2 |
| 8 | 157 | 0.02 | not soluble | | | 95 | 3 |
| 9 | 167 | 0.1 | 66000 | 341000 | 5.2 | 86 | 2.8 |
| 10 | 141b | 0.04b | 105000 | 476000 | 4.5 | 89 | 3.6 |
| 11 | 133 | 0.11 | 82000 | 472000 | 5.8 | 67 | 3.5 |

$^a$very nicely distributed particles with only few medium sized particles
$^b$measurement of particle size was performed in pure water. The use of NaCl solution resulted flocculation of latex.

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

What is claimed is:

1. A composition, comprising:
   a monomer;
   a reactive co-stabilizer; and
   a reactive surfactant; wherein a polymer nanoparticle is prepared using miniemulsion polymerization (MEP) wherein the reactive co-stabilizer is a methacrylate derivative, wherein the methacrylate derivative is a methacrylate containing perfluorinated alcohol.

2. The composition according to claim 1, wherein the methacrylate derivative is a methacrylate containing semi-fluorinated alcohol.

3. The composition according to claim 1, wherein the reactive surfactant is sodium dodecyl sulphate (SDS).

4. The composition according to claim 1, wherein the monomer is styrene.

5. The composition according to claim 1, wherein the polymer nanoparticle has a particle size in between 20 nm to 1000 nm.

6. The composition according to claim 1, wherein the composition further comprise of a second monomer.

7. The composition according to claim 6, wherein the second monomer is n-butyl acrylate (n-BuA).

8. A composition, comprising:
   a reactive co-stabilizer;
   a reactive surfactant;
   a carbon black; and
   a polymer, wherein a polymer/carbon black composite particle is prepared using MEP wherein the reactive co-stabilizer is a methacrylate derivative, wherein the methacrylate derivative is a methacrylate containing perfluorinated alcohol.

9. The composition according to claim 8, wherein the methacrylate derivative is a methacrylate containing semi-fluorinated alcohol.

10. The composition according to claim 8, wherein the reactive surfactant is cetyl trimethyl ammonium chloride (CTAB).

11. The composition according to claim 8, wherein the composite particle is a polystyrene-carbon black (PSt/CB) composite particle.

12. The composition according to claim 8, wherein the composite particle has a particle size in between 20 nm to 1000 nm.

13. The composition according to claim 8, wherein the composite particle has a zero volatile organic content (VOC).

14. The composition according to claim 8, wherein the composition is used as a basic resin in a material for toner application.

* * * * *